United States Patent [19]

Uffner et al.

[11] 4,032,596

[45] June 28, 1977

[54] CURE ACCELERATORS FOR PEROXYKETAL INITATED POLYESTER RESINS

[75] Inventors: Melville W. Uffner, Glen Mills; Burton D. Beitchman, Springfield, both of Pa.

[73] Assignee: Air Products and Chemicals, Inc., Allentown, Pa.

[22] Filed: Oct. 20, 1976

[21] Appl. No.: 734,295

[52] U.S. Cl. .......................... 260/862; 260/77.5 A; 260/77.5 AN; 260/77.5 UA; 260/860; 260/861; 260/864; 260/865

[51] Int. Cl.² ........................................ C08L 67/06

[58] Field of Search ..... 260/862, 864, 865, 77.5 A, 260/77.5 AN, 77.5 UA, 610 R, 610 D, 860, 861, 567.6

[56] References Cited

UNITED STATES PATENTS

| | | | |
|---|---|---|---|
| 2,455,569 | 12/1948 | Dickey | 260/610 R |
| 2,740,765 | 4/1956 | Parker | 260/865 X |
| 2,946,770 | 7/1960 | Bader et al. | 260/77.5 UA |
| 3,644,612 | 2/1972 | Meyer et al. | 260/865 X |
| 3,920,591 | 11/1975 | Jacobs et al. | 260/865 X |
| 3,947,615 | 3/1976 | Fry | 260/865 X |

OTHER PUBLICATIONS

Chem. Abs. 78:P44471u, P115656w; 79:P147025b; 80:P4368a, P48668c, P108069v, P134061f; 82:P58824f; 83:P29043r, P206781c.

Korshak, Polyesters (Pergamon, 1965), pp. 123–125, 158–160, 234, 249, 451–452, 472–473.

*Primary Examiner*—Murray Tillman
*Assistant Examiner*—T. DeBenedictis, Sr.
*Attorney, Agent, or Firm*—Richard A. Dannells; Barry Moyerman

[57] ABSTRACT

Certain quaternary ammonium salts are incorporated in unsaturated polyester thermosetting molding compositions containing peroxyketal initiators to accelerate free radical initiated curing of these compositions.

17 Claims, No Drawings

CURE ACCELERATORS FOR PEROXYKETAL INITATED POLYESTER RESINS

BACKGROUND OF THE INVENTION

1. Field of the Invention

The present invention pertains to curing of unsaturated polyester resins in admixture with ethylenically unsaturated copolymerizable monomers and is particularly concerned with promoting or accelerating the cross linking of such polyester with such vinyl monomers during curing while retaining serviceable shelf-life during storage of the permix at ambient or room temperatures.

2. The Prior Art

The copolymerizable of unsaturated polyester resins with vinyl monomers in the presence of free-radical generating compounds such as organic peroxides is well known in the art. Among the vinylic monomers suggested or employed are: methyl methacrylate, vinyl chloride, vinyl acetate, vinyl toluene, and styrene; the last named being largely preferred. The unsaturated polyesters are obtained by reacting one or more dihydric alcohols with an unsaturated dicarboxylic acid as cis-butenedioic acid (maleic acid) or its anhydride or trans-butenedioic acid (fumaric) or mixtures of these, sometimes in the presence of a saturated dicarboxylic acid such as phthalic or isophthalic. The monomer may comprise 30 to 70% by weight of the admixture with the unsaturated polyester.

A wide range of organic peroxide catalysts, called "initiators," are known and have been commercially employed for the polymerization of unsaturated polyesters and their copolymerization with vinyl monomers. These function by way of undergoing cleavage of the peroxide linkage to form highly active free radicals which initiate the polymerization reaction. These peroxide initiators vary widely as to the temperature at which they initially undergo cleavage and as to the rate of decomposition to provide free radicals at any given temperature. Accelerators, also called promoters, are frequently used to speed up free radical formation from the peroxide at lower temperatures, particularly in connection with formulations intended to be cured at or about room temperature.

A wide use of unsaturated polyester-styrene copolymer systems is in sheet molding compound (SMC) and bulk molding compound (BMC) which comprise the resin reinforced with glass fibers and which generally contain fillers, a lubricant and thickeners. These systems employ initiators that decompose at higher temperatures and further necessitate longer term storage stability than the general purpose resins. While by the inclusion of effective promoters the gel and cure time of such fibrous glass reinforced plastics can be accelerated, these accelerators generally have an adverse effect on required storage stability of the uncured system. Moreover, most BMC and SMC formulations also include a thermoplastic resin, such as an acrylic polymer, to reduce shrinkage during cure. These acrylic polymers are incompatible with the unsaturated polyester and phase rigidly after blending, often resulting in an undesirable mottled surface of the cured product particularly accentuated when the cure is accelerated.

Benzoyl peroxide was at one time the most widely used initiator for polyester molding compositions such as those empolyed in BMC and SMC formulations. However, because this "hot initiator" diminishes the shelf life of these molding compositions even in the presence of commonly employed inhibitors, it has been supplanted in many molding plants by t-butylperbenzoate. More recently, peroxyketal initiators have been introduced as initiators for polyester resin compositions such as BMC and SMC. Among the better known of these peroxyketal initiators in commercial use are 1,1 bis(t-butyl peroxy) cyclohexane and 1,1-di-t-butylperoxy-3,3,5-trimethyl cyclohexane.

To inhibit premature gel formation of polyester resin compositions, various types of inhibitors are generally employed to improve shelf life; the more widely used inhibitors being quinone, hydroquinone or other phenolic types. Quaternary ammonium salts have also been described as efficient inhibitors of gelation during storage of polyester resin compositions. See: Unsaturated Polyesters: Structure and Properties, H. V. Boening, Elsevier, New York (1964), pages 45, 46; and Polyesters and Their Applications by Bjorksten Research Labs, Inc., Rheinhold, New York (1956), pages 53, 54, 172. Most commonly, uncured commercial polyester resin compositions contain 0.01 to about 0.1% or more of an inhibitor of the quinonic or phenolic type to inhibit premature internal polymerization.

In U.S. Pat. Nos. 2,593,787 and 2,627,510 polymerizable polyester resin compositions are described which are stabilized against premature gelation during prolonged periods of storage by incorporation of certain quaternary ammonium salts. The latter patent employs the quaternary ammonium salt in combination with chloranil in such polyester compositions containing a peroxide initiator.

According to U.S. Pat. No. 3,028,360, the stabilizing effect of quaternary ammonium salts and other named inhibitors, is stated to be improved by further incorporation into the unsaturated polyester resin composition of a small amount of a copper salt.

In U.S. Pat. No. 3,288,735, it is stated that unsaturated polyester resins containing free radical polymerization catalyst, may be maintained for extended periods in gel state by admixture into the resin composition of certain types of additives prior to gel formation. Among the various named additives for this purpose is a mixture of a quaternary ammonium compound and a mercaptan.

While recognizing that certain salts of quaternary ammonium compounds are valuable gelation inhibitors in mixtures of unsaturated polyester resins and interpolymerizable monomers, U.S. Pat. No. 2,740,765 indicates that when such interpolymerizable mixtures contain certain peroxide or hydroperoxide initiators and are stabilized with a quinonic or phenolic stabilizer, further incorporation therein of a quaternary ammonium salt accelerates gelation.

In systems employing a redox initiator composed of peroxides and hydroperoxides with sulfur-containing reducing compounds, U.S. Pat. No. 2,946,770 suggests the use of a quaternary ammonium compound in combination with a copper salt, to accelerate polymerization time.

While accelerators or promoters are more usually employed in connection with peroxide initiators in resin formulations intended to be cured at or about room temperature, the use of promoters is not limited thereto. Not all peroxide initiators, however, can be activated by known promoters (Boening, ibid page 46). Among the free radical initiators that can be promoted are ketone peroxides, such as MEK peroxide, benzoyl peroxide, t-butyl peroctoate and t-butyl perbenzoate. Among the best known promoters are metal compounds (primarily those of cobalt such as cobalt naphthenate) and certain amines, particularly dimethyl aniline. For t-butylperbenzoate the preferred promoter is cobalt naphthenate. While dimethyl aniline is known to accelerate benzoyl peroxide at room to moderate temperatures, cobalt naphthenate does not do so.

While under certain conditions and particularly in specific combinations with heavy metal compounds or other accelerating adjuvants, quaternary ammonium compounds have been reported to accelerate copolymerization of unsaturated polyester resins with vinyl type monomers in the presence of certain peroxide or hydroperoxide free radical initiators, these quaternary ammonium compounds have been found ineffective as promoters in BMC and SMC cured at high temperature with benzoyl peroxide or t-butyl perbenzoate. While the curing of such unsaturated polyester molding compositions employing t-butyl perbenzoate initiator can be accelerated by heavy metal compounds such as organic cobalt compounds, the extent of such acceleration is diminished in the presence of quaternary ammonium salts. On the other hand, such cobalt compounds are ineffective in unsaturated polyester molding compositions cured at elevated temperature with peroxyketal initiators. In fact, prior to the present invention, no effective means for accelerating the decomposition of peroxyketal initiators was known to the art.

SUMMARY OF THE INVENTION

It has now been unexpectedly discovered, in accordance with the present invention, that curing molding compositions of an unsaturated polyester of a dihydric alcohol and an alpha-beta ethylenically unsaturated dicarboxylic acid by interpolymerization with vinylic monomers catalyzed by peroxyketal initiators, particularly such compositions intended for bulk molding or sheet molding, can be accelerated by certain quaternary ammonium compounds which are soluble in the polyester.

DESCRIPTION OF PREFERRED EMBODIMENTS

A number of peroxyketal compounds have been proposed for use as initiators in polyester resin compositions, particularly those wherein the two peroxy groups are attached to a single carbon atom. These conform to the structure

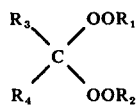

wherein $R_1$ and $R_2$ each represent an alkyl radical, $R_3$ is an alkyl radical and $R_4$ is an aliphatic radical which contain a hydroxy or carboxyl group, or $R_3$ and $R_4$ together constitute a polymethylene chain linked at each end to the same carbon atom of the indicated structure. Among these compounds more often encountered are those in which $R_1$ and $R_2$ each contains a tertiary carbon atom. The diperoxy ketal compounds more widely used in present commercial practice are: 1,1-bis(t-butyl peroxy) cyclohexane (TBPC), represented by the formula

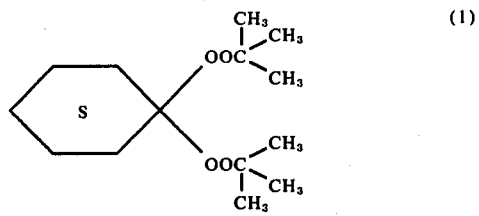

and 1,1-di-t-butylperoxy-3,3,5-trimethyl cyclohexane (TBTC) represented by the formula

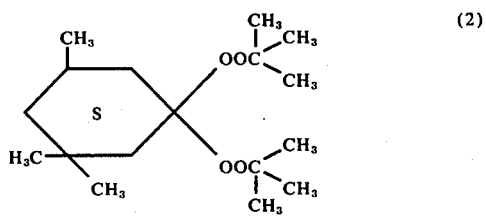

Each of these compounds is marketed as a solution in dibutyl phthalate. The synthesis of these and other diperoxy ketal compounds is described in U.S. Pat. Nos. 2,455,569 and 3,344,125.

These diperoxyketal compounds have recognized advantages over the initiators previously commonly employed in unsaturated polyester molding compositions, such as t-butyl perbenzoate and benzoyl peroxide.

The improved performance of a diperoxyketal initiator when promoted by an organic quaternary ammonium chloride will be appreciated from the data pertaining to the curring of a typical two component polyester resin composition in Example 1 below:

EXAMPLE 1

| Resin Composition | | |
|---|---|---|
| paraplex P-19D[(1)] | 100 | 100 |
| Peroxyketal (TBPC) | 1 | 1 |
| Benzyltrimethylammonium chloride | — | 0.1 |

TABLE 1

| SPI BLOCK EXOTHERM DATA AT 250° F (121.1° C) | | |
|---|---|---|
| Gel time (minutes) | 1.60 | 1.12 |
| Cure time (minutes) | 1.93 | 1.38 |
| Peak exotherm (° F) | 465 | 460 |
| Peak exotherm (° F) | 240.6 | 237.8 |
| Kick off (° F) | 225 | 210 |
| Kick off (° C) | 107.2 | 98.9 |

It will be seen from the above data that with the use of the quaternary ammonium salt in the formulation about 30% acceleration in cure time was achieved, despite the presence of the usual phenolic inhibitor in the commercial resin system.

EXAMPLE 2

In Table 2 below is shown the SPI block exotherm data obtained on curing of a polyester resin composition initiated with 1,1-di-t-butylperoxy-3,3,5-trimethyl cyclohexane (0.75 phr) in the presence of indicated amounts of designated ammonium salts. the same commercial polyester resin composition was used as in the previous example.

| Ammonium salts tested | Phr |
|---|---|
| (a) None | — |
| (b) Benzyltrimethylammonium chloride | 0.1 |
| (c) Guanidine hydrochloride | 0.2 |
| (d) Benzyldimethylstearylammonium chloride | 0.5 |
| (e) Alkyl (98% $C_{12}$ and 2% $C_{14}$) dimethyl-1-naphthylmethylammonium chloride monohydrate | 0.5 |
| (f) ammonium saccharinate | 0.5 |
| (g) Alkyl (chiefly, e.g. >90% $C_{14}$) benzyl-dimethylammonium chloride dihydrate | 0.5 |

TABLE 2

| SPI BLOCK EXOTHERM DATA AT 250° F (121.1° C) | | | | | | | |
|---|---|---|---|---|---|---|---|
| Promoter | (a) | (b) | (c) | (d) | (e) | (f) | (g) |
| Gel time (minutes) | 1.78 | 1.12 | 1.70 | 0.91 | 0.86 | 1.72 | 1.01 |
| Cure time (minutes) | 2.15 | 1.38 | 2.07 | 1.30 | 1.30 | 2.09 | 1.37 |
| Peak exotherm (° F) | 470 | 460 | 448 | 440 | 419 | 432 | 432 |
| Peak exotherm (° C) | 243.3 | 237.8 | 231.1 | 226.7 | 215 | 222.2 | 222.2 |
| Kick off (° F) | 225 | 210 | 235 | 210 | 205 | 230 | 210 |
| Kick off (° C) | 107.2 | 98.9 | 112.2 | 98.9 | 96.1 | 110 | 98.9 |
| % Acceleration | — | 36 | 4 | 40 | 40 | 3 | 36 |

The data in Table 2 shows that whereas the quaternary ammonium halides accelerated the cure time by 36 to 40% over that of the non-promoted mixture, the other two ammonium salts tested (c and f above) obtained only 3 to 4% acceleration. At least about 10% acceleration is deemed of practical significance.

The effect of varying the concentration of the quaternary ammonium halide is shown by the data in the following example.

EXAMPLE 3

| | Parts per hundred (phr) of resin |
|---|---|
| Paraplex P-19D[1] | 100 |
| 1,1-di-t-butyl peroxy-3,3,5-trimethyl cyclohexane | 0.75 |
| Alkyldimethyl-1-naphthylmethyl-ammonium chloride monohydrate (alkyl = 98% $C_{12}$, 2% $C_{14}$) | As indicated in Table 3 below |

[1]See Example 1

TABLE 3

| SPI BLOCK EXOTHERM DATA AT 250° F (121.1° C) | | | | | | | | |
|---|---|---|---|---|---|---|---|---|
| Quat. compd (phr) | 0 | 0.05 | 0.1 | 0.2 | 0.4 | 0.8 | 1.6 | 3.2 |
| Gel time (min.) | 1.76 | 1.51 | 1.28 | 1.21 | 1.05 | 0.84 | 0.83 | 0.90 |
| Cure time (min.) | 2.23 | 1.87 | 1.75 | 1.61 | 1.48 | 1.26 | 1.14 | 1.22 |
| Peak Exotherm (° F) | 411 | 442 | 437 | 435 | 423 | 429 | 449 | 442 |
| Peak Exotherm (° C) | 210.6 | 227.8 | 225 | 223.9 | 217.2 | 220.6 | 231.7 | 227.8 |
| Kick off (° F) | 235 | 230 | 220 | 215 | 215 | 200 | 210 | 220 |
| Kick off (° C) | 112.8 | 110 | 104.4 | 101.7 | 101.7 | 93.3 | 98.9 | 104.4 |
| % Acceleration | — | 13 | 19 | 25 | 31 | 41 | 47 | 43 |

The data in Table 3 show that over 10% acceleration was obtained with as little as 0.05 parts of the quaternary ammonium chloride employed, with increasing degree of acceleration as the concentration of the quaternary salt was increased, reaching a peak at about 1.6 resin obtained no significant advantage over lesser amounts. Accordingly, the preferred range depending upon the quaternary chloride employed, lies between 0.05 and 3.0 parts of quaternary ammonium chloride per hundred parts resin, more particularly in the range of about 0.5 to 2.0.

In Example 4 two commonly used initiators for sheet and bulk molding polyester resin compositions are compared with a commercial diperoxyketal, using various types of promoters.

EXAMPLE 4

| COMPOSITION OF MIXTURE | | | | | | | | | |
|---|---|---|---|---|---|---|---|---|---|
| | Parts per hundred of resin | | | | | | | | |
| Paraplex P-19D[1] | ← 100 → | | | | | | | | |
| Run Number | 1 | 2 | 3 | 4 | 5 | 6 | 7 | 8 | 9 |
| 20% Quat.[2] in ethylene glycol | — | 1.25 | — | 1.25 | — | 1.25 | — | — | 2.5 |
| Cadox BFF-50[3] | 2 | 2 | — | — | — | — | — | — | — |
| t-butyl perbenzoate | — | — | 1 | 1 | 1 | 1 | — | — | — |
| Percadox 29B75[3] | — | — | — | — | — | — | 1 | 1 | 1 |
| 6% Cobalt Naphthenate | — | — | — | — | 0.2 | 0.2 | — | 0.2 | — |

[1]See Example 1
[2]The quaternary salt was 1,4-dibenzyl-1,4-diazoniabicyclo-(2-2-2)-octane dichloride.
[3]50% benzoyl peroxide in a phthalate plasticizer.
[4]75% of 1,1-di-t-butyl peroxy-3,3,5-trimethyl cyclohexane dissolved in dibutyl phthalate and marketed by Noury Chemical Corp.

TABLE 4

| SPI BLOCK EXOTHERM DATA AT 250° F (121.1° C) | | | | | | | | | |
|---|---|---|---|---|---|---|---|---|---|
| Run No. | 1 | 2 | 3 | 4 | 5 | 6 | 7 | 8 | 9 |
| Gel time (min.) | 0.60 | 0.74 | 4.21 | 4.16 | 1.20 | 1.82 | 2.20 | 2.37 | 1.48 |
| Cure time (min.) | 1.04 | 1.14 | 4.73 | 4.78 | 1.58 | 2.35 | 2.64 | 2.79 | 1.87 |
| Peak Exotherm (°F) | 375 | 375 | 430 | 440 | 385 | 400 | 440 | 410 | 395 |
| Peak Exotherm (°C) | 190.5 | 190.5 | 221.1 | 226.7 | 196.1 | 204.4 | 210 | 210 | 201.7 |
| Kick off (°F) | 210 | 210 | 255 | 260 | 225 | 220 | 235 | 240 | 225 |
| Kick off (°C) | 98.9 | 98.9 | 123.9 | 126.7 | 107.2 | 104.4 | 112.8 | 115.6 | 107.2 |
| % Acceleration | — | −10 | — | −1 | 67 | 51 | — | −6 | 29 |

Comparing run 1 vs. 2 and run 3 vs. 4 in Table 4 above, it will be seen that neither benzoyl peroxide nor t-butyl perbenzoate was accelerated by the quaternary ammonium chloride. On the other hand, the peroxyketal promoted cure was accelerated by the quaternary salt employed but not by the cobalt compound, as is evident in comparing run 7 with run 9 and run 8 with run 9. Moreover, from run 3 compared with run 5, and run 5 compared with run 6, it is evident that the t-butyl perbenzoate initiator is accelerated by the cobalt compound but that the extent of acceleration is diminished in the simultaneous presence of the quaternary ammonium salt employed.

The practical value of a promoter for free radical initiators used in polyester resin formulations depends not only upon the extent of acceleration in cure time afforded by the promoter but also upon the effect of that promoter on the storage stability of the uncured resin mixture.

The various quaternary ammonium compounds listed in Table 5 below were tested to determine the extent to which these accelerated curing of polyester resin mixtures by a peroxyketal initiator, and the effect of the quaternary compound on the shelf life of the resin mixture both in neat form (without thickener and lubricant additives) and in paste form containing conventional thickener and lubricant.

The base formulas of the mixtures tested are shown below. The quaternary promoters were used as 20% solutions in ethylene glycol.

NEAT RESIN

| | Parts by weight |
|---|---|
| Paraplex P-19D[1] | 100 |
| Promoter solution | 1.25 |
| 1,1-bis(t-butylperoxy)3,3,5-trimethyl cyclohexane | 1 |

[1]See Example 1.

PASTE RESIN

To the above neat reason there was added:

| | phr |
|---|---|
| Zinc stearate | 5 |
| Calcium carbonate | 150 |
| Magnesium hydroxide | 2.5 |

TABLE 5

Effect of Promoter on Acceleration of Peroxyketal Initiated Cure and on Shelf Life

| | Promoter | % Accel. of Cure Time at 250° F (121.1° C) | Shelf-Life of Paste at 100° F (37.8° C) Days | Shelf-Life of Neat Resin at 73° F, (22.8° C) Days |
|---|---|---|---|---|
| 1. | None | — | 15 | 69 |
| 2. | 1,4-dibenzyl-1,4-diazoniabicyclo-(2.2.2)-octane dichloride | 29 | 8 | 28 |
| 3. | 1,4-bis(3-chlorobenzyl)-1,4-diazoniabicyclo-(2.2.2)-octane dichloride | 25 | 9 | 31 |
| 4. | 1,4-bis(2-methylbenzyl)-1,4-diazoniabicyclo-(2.2.2)-octane dichloride | 56 | 8 | >6<8 |
| 5. | 1,4-bis(3-methylbenzyl)-1,4-diazoniabicyclo-(2.2.2)-octane dichloride | 36 | 8 | 14 |
| 6. | 1,4-bis(4-methylbenzyl)-1,4-diazoniabicyclo-(2.2.2)octane dichloride | 45 | 7 | 7 |
| 7. | 1-benzyl-4-hexadecyl-1,4-diazoniabicyclo-(2.2.2)octane dichloride | 5 | 8 | 65 |
| 8. | 1,4-bis(1-naphthylmethyl)-1,4-diazoniabicyclo-(2.2.2)octane dichloride | 20 | — | 30 |
| 9. | 1-benzyl alkylpyridinium chloride | 42 | 3 | 19 |
| 10. | 1,4-bis(4-nitrobenzyl)-1,4-diazoniabicyclo-(2.2.2)octane dichloride | | Insoluble in Resin | |
| 11. | 1-(1-naphthylmethyl)-4-aza-1-azoniabicyclo-(2.2.2)octane chloride | 18 | 7 | 93 |
| 12. | 1-benzylpyridinium chloride | 54 | 7 | 7 |
| 13. | (1-methyltrimethylene)-bis[benzyldimethylammonium] dichloride | 25 | 8 | 44 |
| 14. | (oxydiethylene)bis[benzyldimethylammonium] dichloride | 29 | 6 | 32 |
| 15. | Benzyldimethylanilinium chloride | 50 | 7 | 9 |
| 16. | Benzylquinolinium chloride | 51 | 5 | >1<4 |
| 17. | 1,4-dibenzyl-2-methyl-1,4-diazoniabicyclo-(2.2.2)-octane dichloride | 34 | 8 | 21 |
| 18. | Benzyldimethylhydroxyethylammonium chloride | 27 | 6 | 22 |
| 19. | Benzylcyclohexyldimethylammonium chloride | 32 | 6 | 19 |
| 20. | Benzyltris(hydroxyethyl)ammonium chloride | 2 | 7 | — |
| 21. | 1,4-bis(3-nitrobenzyl)-1,4-diazoniabicyclo-(2.2.2)-octane dichloride | | Insoluble in Resin | |
| 22. | 1,4-diallyl-1,4-diazoniabicyclo-(2.2.2)-octane dichloride | 22 | 9 | 57 |
| 23. | 1-benzyl-2,4-lutidinium chloride | 65 | <2 | 21 |
| 24. | Benzylimidazolium chloride | 76 | 8 | <½ Hr. |
| 25. | 1-(4-chlorobenzyl)pyridinium chloride | 40 | 5 | 9 |
| 26. | 1,1'-(p-phenylenedimethylene) dipyridinium dichloride | 52 | 6 | 40 |
| 27. | 1-benzyl-4-aza-1-azoniabicyclo- | None | 9 | — |

TABLE 5-continued

Effect of Promoter on Acceleration
of Peroxyketal Initiated Cure and
on Shelf Life

| | Promoter | % Accel. of Cure Time at 250° F (121.1° C) | Shelf-Life of Paste at 100° F (37.8° C) Days | Shelf-Life of Neat Resin at 73° F, (22.8° C) Days |
|---|---|---|---|---|
| | (2,2,2)-octane bromide | | | |
| 28. | 1-allylpyridinium chloride | Insoluble in Resin | | |
| 29. | 78.4% 1,4-di(acetonyl)-1,4-diazonia-bicyclo-(2.2.2)-octane dichloride + 14.9% 1-acetonyl-4-aza-1-azonia-bicyclo-(2.2.2)-octane chloride | 40 | 6 | 37 |
| 30. | Benzyltripropylammonium chloride | 47 | 5 | 17 |
| 31. | Quaternary chloride from tris (2,4,6-dimethylamino)phenol and benzyl chloride, ⅓ mole ratio | 35 | 5 | 20 |
| 32. | Quaternary chloride from N-(2-dimethylaminoethyl)morpholine and benzyl chloride, ½ mole ratio | 26 | 8 | — |
| 33. | Quaternary chloride from 2,4,6-tris (chloromethyl)mesitylene and pyridine, ⅓ mole ratio | Insoluble in Resin | | |
| 34. | 1,4-bis(4-chlorobenzyl)-1,4-diazonia-bicyclo-(2.2.2)-octane dichloride | 52 | 8 | <4 |
| 35. | 1-(1-naphthylmethyl)pyridinium chloride | 43 | 8 | 8 |
| 36. | Benzyltriallylammonium chloride | 50 | 8 | 12 |
| 37. | 1-benzyl-4-picolinium chloride | 54 | <2 | 6 |
| 38. | 1,4-dibenzyl-1,4-diazabicyclo-(2.2.2)-octane dibromide | None | 11 | 32 |
| 39. | Polymer of 1,4-diazoniabicyclo-(2.2.2)-octane and 1,4-bis (chloromethyl)benzene | 8 | 11 | — |
| 40. | 1-benzyl-2-picolinium chloride | 58 | <3 | 21 |
| 41. | 1-benzyl-3-picolinium chloride | 56 | 8 | 13 |
| 42. | 1,2-dibenzylpyridinium chloride | 59 | <2 | 19 |
| 43. | 1,4-dibenzylpyridinium chloride | 58 | <2 | 12 |

From the data appearing in Table 5 above, it will be observed that the quaternary ammonium bromides used (compounds numbered 27 and 38 of the table) were not effective in accelerating the diperoxyketals in the resin system tested. Compounds such as number 20 did obtain slight acceleration short of that desired for practical use. Accordingly, it was deduced that the desired quaternary chlorides for use in acceleration of diperoxyketal initiators should have no more than two hydroxy alkyl groups attached to the quaternary nitrogen. In compounds containing two or more quaternized heteronitrogen groups it is best that neither of these nitrogen groups contain a carbon-linked substituent having more than 12 consecutive carbon atoms. Compound numbered 39 in the particular test recorded obtained an acceleration approaching the borderline of the desired 10%. Accordingly, polymeric quaternary ammonium compounds of high molecular weight (more than about 600) and having an average of more than four quaternized nitrogen groups are not included among the preferred compounds for practical use as accelerators for diperoxyketals.

The most preferred quaternary compounds for acceleration of peroxyketal initiators for polyester resin compositions are those which obtain a satisfactory acceleration in cure time while retaining desired long storage stability as determined by shelf life of the neat resin and of the paste preparation in the presence of the initiator. Thus, compounds such as those numbered 2, 3, and 13 would be included among the most favored quaternary ammonium accelerators, since these exhibit the best balance of properties considering rapidity of cure and storage stability. Accelerators which reduce the shelf life of the initiator-containing resin mixture to less than the desired minimum (3 days for the neat resin and 7 to 8 days for the thickened paste) but which give a comparatively high acceleration in cure time, are nevertheless useful. Accelerators which exhibit exceptionally rapid curing properties (e.g. those compounds numbered 4, 5, 6, 12, etc. in Table 5 above), despite the shortened shelf life of the initiated neat resin are nevertheless highly beneficial for use in BMC and SMC resin mixtures. The compounder, however, would be obliged in a short time to compound the initiated neat resin containing the accelerator with the additives and thickeners employed in the BMC or SMC, to avoid premature deterioration of the batch. On the other hand, initiated neat resin mixtures containing an accelerator such as favored compounds numbered 2, 3 and 13 in the foregoing table, could be stored for a much longer period.

In the following Table 6, the acceleration properties of certain quaternary ammonium chlorides is demonstrated in a single component commercial unsaturated polyester resin mixture comprising peroxyketal initiator.

TABLE 6

SPI BLOCK EXOTHERM DATA AT 250° F (121.1° C)

| | Parts by weight | | | |
|---|---|---|---|---|
| OCF Resin E920[1] | ← | 100 | | → |
| 1,1-bis(t-butyl peroxy) 3,3,5-trimethyl cyclohexane | ← | 1 | | → |
| 1-(vinylbenzyl)-4-aza-1-azoniabicyclo-(2.2.2)-octane chloride | — | — | — | 0.5 |
| 1,4-dibenzyl-1,4-diazoniabicyclo (2.2.2)-octane | — | — | 0.5 | — |

TABLE 6-continued

SPI BLOCK EXOTHERM DATA AT 250° F (121.1° C)

| | Parts by weight | | | |
|---|---|---|---|---|
| dichloride | | | | |
| 1-benzyl-4-aza-1-azonia-bicyclo-(2.2.2)-octane chloride | — | 0.5 | — | — |
| Cure time, min. | 2 | 1.8 | 1.1 | 1.6 |
| % Acceleration | — | 10 | 45 | 24 |

(1) Resin composition marketed by Owens-Corning Fiberglass Corp., comprising a major amount of an unsaturated polyester resin dissolved in a styrene monomer and containing a thermoplastic low shrink additive, such as polymethyl methacrylate, polyvinyl-acetate or copolymers thereof.

Many formulations for SMC and BMC commonly include a pigment such as black iron oxide. These pigments often adversely effect the shelf-life of these resin mixtures at moderate temperatures. The presence of iron oxide was found to have a negligible effect on the performance of peroxyketal initiated formulations containing quaternary ammonium chloride acceleration, as will be seen in Table 7 below.

TABLE 7

| Composition | Parts by weight | | |
|---|---|---|---|
| Paraplex P-19(1) | 100 | 100 | 100 |
| Zinc stearate | 5 | 5 | 5 |
| 1,1-bis(t-butylperoxy) 3,3,5-trimethyl cyclohexane | 1 | 1 | 1 |
| Calcium carbonate | 150 | 150 | 150 |
| Magnesium hydroxide | 2.5 | 2.5 | 2.5 |
| Black iron oxide | — | 0.5 | 0.5 |
| 1,4-dibenzyl-1,4-diazonia-bicyclo-(2.2.2) octane dichloride | — | — | 0.25 |
| Shelf-life days at 100° F (38° C) (days) | 15 | 14 | 11 |

(1)See Example 1.

The effect of the concentration of the quaternary accelerator on the curing rate of the resin is further demonstrated in Tables 8 and 9 below.

The neat resin mixture used to obtain data of Table 8 contained 100 parts Paraplex P-19D described in Example 1, 1 part 1, 1-bis (t-butyl peroxy)-3,3,5-trimethyl cyclohexane and the indicated quantities (phr) of 1,4-dibenzyl-1,4, diazonia-bicyclo-(2.2.2)-octane dichloride as the accelerator.

TABLE 8

| Accelerator (phr) | — | 0.1 | 0.25 | 0.5 | 1 | 1.5 | 3 |
|---|---|---|---|---|---|---|---|
| Cure time (min) | | | | | | | |
| at 250° F (121.1° C) | 2.9 | 1.9 | 1.7 | 1.5 | 1.5 | 1.5 | 1.9 |
| at 300° F (149° C) | 1.2 | 0.8 | 0.75 | 0.75 | 0.9 | 0.8 | 1.0 |

The resin employed to obtain the Table 9 data was 100 parts of Selectron 50158 (marketed by P.P.G. Industries) which comprised a major amount of an unsaturated polyester resin dissolved in styrene monomer and containing a thermoplastic low shrink additive of the same type as described in Table 6. The same initiator was used as in the Table 8 formulation. The amounts of 1,4-bis(2-methylbenzyl)-1,4-diazoniabicyclo (2.2.2)-octane dichloride indicated in Table 9 were added as the accelerator.

TABLE 9

| Accelerator (phr) | — | 0.25 | 0.5 | 1 |
|---|---|---|---|---|
| Cure time at 250° F (121.1° C), (min.) | 2.3 | 2.5 | 2.0 | 1.7 |

Table 10 presents data regarding the effect of quaternary ammonium chlorides on the rate of cure of various commercial unsaturated polyester resins initiated with diperoxyketals.

TABLE 10

Effect of Quaternary Ammonium Chlorides on Rate of Cure of Various Commercial Resins Initiated With Peroxyketals

| | 1 | 2 | 3 | 4 | 5 | 6 | 7 | 8 | 9 | 10 |
|---|---|---|---|---|---|---|---|---|---|---|
| Paraplex P-19D(1) | 100 | 100 | — | — | — | — | — | — | — | — |
| OCF Resin E-920(2) | — | — | 100 | 100 | — | — | — | — | — | — |
| Selectron 50158(3) | — | — | — | — | 100 | 100 | — | — | — | — |
| RCR-4297(4) | — | — | — | — | — | — | 100 | 100 | — | — |
| GR-63003(5) | — | — | — | — | — | — | — | — | 100 | 100 |
| n-Alkyl (98% C$_{12}$, 2% C$_{14}$) dimethyl-1-naphthylmethylammonium chlorides monohydrate | — | — | — | 0.5 | — | — | — | — | — | — |
| 1,4-dibenzyl-1,4-diazoniabicyclo-(2.2.2)-octane dichloride | — | 0.5 | — | — | — | — | — | — | — | 0.25 |
| 1-benzylpyridinium chloride | — | — | — | — | — | 1 | — | 1 | — | — |
| 1,1-bis(t-butyl-peroxy) 3,3,5-trimethyl-cyclohexane | 1 | 1 | — | — | 1 | 1 | 1 | 1 | — | — |
| 1,1-bis(t-butyl-peroxy) cyclohexne peroxy) cyclohexane | — | — | 1 | .1 | — | — | — | — | 1 | 1 |
| SPI Block Exotherm Data at 250° F (121.1° C) | | | | | | | | | | |
| Gel Time, Min. | 2.20 | 1.48 | 2.14 | 1.21 | 1.89 | 1.50 | 1.73 | 0.79 | 1.53 | 0.95 |
| Cure Time, Min. | 2.64 | 1.87 | 2.42 | 1.56 | 2.35 | 1.92 | 2.23 | 1.30 | 1.78 | 1.21 |
| Peak Exotherm, ° F | 410 | 395 | 405 | 425 | 375 | 375 | 410 | 400 | 460 | 430 |
| Peak Exotherm, ° C | 210 | 201.7 | 207.2 | 218.3 | 190.6 | 190.6 | 210 | 204.4 | 237.8 | 221.1 |
| Kick-off, ° F | 235 | 225 | 240 | 230 | 235 | 240 | 230 | 200 | 230 | 220 |
| Kick-off, ° C | 112.8 | 107.2 | 115.6 | 110 | 112.8 | 115.6 | 110 | 93.3 | 110 | 104.4 |

(1)See Example 1 above.
(2)See Table 6 above.
(3)See Table 9 above.
(4)A resin comprising a major amount of an unsaturated polyester resin dissolved in styrene and containing a low shrink additive of the type as described in Table 6 above and marketed by the Glidden Division of SCM Corporation.
(5)A resin of the same type as described under (4) above and manufactured by the Hatco Chemical Division of W. R. Grace Corporation.

In general, the peroxyketal initiator is employed in the resin formulation in the amount usually employed in the art, that is from about 0.5 to 2.0 parts by weight per hundred parts of ultimate resin polymer. The quaternary ammonium chloride accelerator is often effective in amounts as low as 0.05% by weight of ultimate resin polymer and up to about 10%, but little, if any, added advantage is had in employing amounts in excess of about 1 or 2% accelerator by weight of ultimate polymer. The preferred range is from about 0.25% to 1% accelerator by weight of the polymer formed.

The quaternary ammonium compounds may be prepared from available tertiary amines by well-known methods, such as by reaction of the tertiary amine with an organic halide.

Typical compositions for bulk and sheet molding may comprise:

|  | Parts by weight |
|---|---|
| Unsaturated polyester resin plus vinyl monomer with or without a thermoplastic resin low shrink additive | 25-30 |
| CaCO₃ filler | 40-55 |
| Lubricant (e.g. zinc stearate) | 1-2 |
| Glass reinforcement (¼" to 1" chopped strand) | 10-30 |
|  | PHR |
| Accelerator (quat. ammonium chloride) | 0.5-1 |
| Thickener (magnesium hydroxide) | 2-3 |
| Initiator (diperoxyketal) | 0.8-1.2 |

We claim:
1. A curable polyester mixture comprising:
   a. an unsaturated polyester of a dihydric alcohol and an alpha-beta ethylenically unsaturated dicarboxylic acid,
   b. ethylenically unsaturated copolymerizable monomer,
   c. free radical initiating diperoxyketal, and
   d. an organic quaternary ammonium chloride in amount effective to accelerate free radical initiation of said diperoxyketal, said quaternary compound being soluble in the mixture.

2. A mixture as defined in claim 1 wherein the two peroxy groups of the diperoxyketal are directly attached to a carbon atom of a cyclohexylic structure.

3. A mixture as defined in claim 2 wherein each of said peroxy groups contains a tertiary alkyl group directly linked to the peroxy oxygen.

4. A mixture as defined in claim 1 wherein each of the peroxy groups of the diperoxyketal contains a tertiary alkyl group directly linked to the peroxy oxygen.

5. A mixture as defined in claim 1 wherein said quaternary ammonium chloride contains 1 to 2 quaternized hetrocyclic nitrogen atoms.

6. A mixture as defined in claim 1 wherein said quaternary ammonium chloride is one formed by quaternizing diazabicyclooctane.

7. A mixture as defined in claim 1 wherein said quaternary ammonium chloride is a 1,4-dibenzyl-1,4-diazonia-bicyclo(2.2.2)-octane dichloride wherein said benzyl groups may further contain alkyl or chloro substituents.

8. A mixture as defined in claim 1 wherein said quaternary compound is (1-methyltrimethylene)-bis[benzyldimethylammonium] dichloride.

9. A curable polyester mixture comprising:
   a. an unsaturated polyester of a dihydric alcohol and an alpha-beta ethylenically unsaturated dicarboxylic acid,
   b. at least one ethylenically unsaturated copolymerizable monomer,
   c. free radical initiating diperoxyketal of the formula:

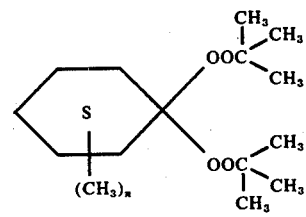

in which $n$ is from 0 to 3, and
   d. an amount of a quaternary ammonium chloride effective to accelerate curing of said mixture, said quaternary compound being dissolved in the mixture.

10. A curable polyester mixture as defined in claim 9 wherein said quaternary ammonium chloride is a quaternized heterocyclic nitrogen compound wherein at least one quaternary nitrogen thereof has an attached benzyl or naphthylmethyl substituent.

11. A curable polyester mixture as defined in claim 9 wherein said quaternary ammonium chloride is an aliphatic compound having at least one benzyl group attached to nitrogen, said compound having, if any, no more than two hydroxyalkyl groups attached to the quaternary nitrogen.

12. A curable mixture for bulk or sheet molding having a serviceable shelf life, comprising:
   a. an unsaturated polyester resin compound of a dihydric alcohol and an alpha-beta ethylenically unsaturated dicarboxylic acid,
   b. at least one ethylenically unsaturated reactive monomer,
   c. a thermoplastic resin,
   d. a free-radical initiating diperoxyketal compound,
   e. quinolic or phenolic inhibitor, and
   f. an amount of a quaternary ammonium chloride dissolved in said mixture, effective in accelerating curing of said mixture at elevated temperature.

13. The method of accelerating the curing rate of bulk molding and sheet molding polyester resin systems containing a diperoxyketal initiator and a gelation inhibitor of the phenolic or quinonic type, which method comprises effecting such curing in the presence of an accelerator consisting essentially of 0.25 to 1.0 parts by weight of a quaternary ammonium chloride per hundred parts of resin-forming components dissolved in said resin-forming components.

14. The method as defined in claim 13 wherein said quaternary ammonium chloride contains 1 to 2 quaternized heterocyclic nitrogen atoms.

15. The method as defined in claim 13 wherein said quaternary ammonium chloride is one formed by quaternizing a diazabicyclooctane compound.

16. The method as defined in claim 13 wherein said diperoxyketal initiator is one corresponding to the formula:

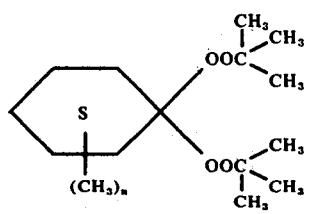

in which n is from 0 to 3.

17. The method of accelerating the curing rate of interpolymerizable compositions which comprise a liquid solution of a polyester resin in a copolymerizable ethylenically unsaturated monomer, in association with a peroxyketal initiator, and further containing a quinonic or phenolic gelation inhibitor, which method comprises dissolving in such composition a small quantity of at least one quaternary ammonium chloride compound, said quaternary compound containing no more than two hydroxy alkyl groups attached to quaternary nitrogen, and when said quaternary compound contains two or more quaternized nitrogen groups, neither of these nitrogen groups contains a carbon-linked substituent having more than 12 consecutive carbon atoms.

* * * * *

UNITED STATES PATENT AND TRADEMARK OFFICE
CERTIFICATE OF CORRECTION

PATENT NO. : 4,032,596
DATED : June 28, 1977
INVENTOR(S) : Melville W. Uffner et al.

It is certified that error appears in the above-identified patent and that said Letters Patent are hereby corrected as shown below:

Column 1, Line 13
    Delete "permix" and substitute therefor -- premix --

Column 1, Line 16
    Delete "copolymerizable" and substitute therefor
    -- copolymerization --

Column 1, Line 24
    After "acid" and before "as", insert -- such --

Column 1, Line 62
    Delete "rigidly" and substitute therefor -- rapidly --

Column 3, Line 59
    After "which", insert -- may --

Column 4, Line 36
    Delete "curring" and substitute therefor -- curing --

Column 4, Line 46
    Add -- (1) Mixture of 60 parts of an unsaturated polyester resin and 40 parts of polymethyl methacrylate resin each dissolved in styrene and manufactured by Rohm & Haas Corp. --

UNITED STATES PATENT AND TRADEMARK OFFICE
CERTIFICATE OF CORRECTION

PATENT NO. : 4,032,596
DATED : June 28, 1977
INVENTOR(S) : Melville W. Uffner et al.

It is certified that error appears in the above-identified patent and that said Letters Patent are hereby corrected as shown below:

Column 6, Line 2
    After "1.6", insert -- parts. In most instances use of more than about 2 parts of the quaternary ammonium chloride per hundred of --

Signed and Sealed this

Eighth Day of November 1977

[SEAL]

Attest:

RUTH C. MASON
Attesting Officer

LUTRELLE F. PARKER
Acting Commissioner of Patents and Trademarks